United States Patent [19]
Ashikawa et al.

[11] Patent Number: 4,977,989
[45] Date of Patent: Dec. 18, 1990

[54] DOG CLUTCH MECHANISM

[75] Inventors: Noboru Ashikawa; Kazuhiko Shimada; Shoji Tokushima; Tetsurou Hamada; Naoya Akama; Masami Takano; Makoto Watanabe, all of Tochigi, Japan

[73] Assignee: Honda Giken Kogyo Kabushiki Kaisha, Tokyo, Japan

[21] Appl. No.: 212,431

[22] Filed: Jun. 28, 1988

[30] Foreign Application Priority Data

Jun. 30, 1987 [JP] Japan .................... 62-162620
Jul. 13, 1987 [JP] Japan .................... 62-107315[U]
Aug. 19, 1987 [JP] Japan .................... 62-205881

[51] Int. Cl.$^5$ .............................................. F16D 7/08
[52] U.S. Cl. ..................... 192/56 R; 192/113 B; 192/67 R; 192/114 R; 403/328
[58] Field of Search ................ 192/56 R, 67 R, 84 R, 192/114 R, 113 B; 403/324, 322, 328

[56] References Cited

U.S. PATENT DOCUMENTS

| 2,733,791 | 2/1956 | Short | 192/114 R |
|---|---|---|---|
| 2,780,332 | 2/1957 | Stevens | 192/56 R |
| 2,881,888 | 4/1959 | Amtsberg | 192/56 R |
| 2,887,201 | 5/1959 | Willis | 192/114 R |
| 3,905,458 | 9/1975 | Mehrbrodt | 192/84 R |
| 4,303,151 | 12/1981 | Kolacz | 192/114 R |
| 4,471,860 | 9/1984 | Yamada | 192/84 R |

FOREIGN PATENT DOCUMENTS

| 700706 | 12/1953 | United Kingdom . |
|---|---|---|
| 1551009 | 12/1953 | United Kingdom . |
| 738458 | 10/1955 | United Kingdom . |
| 746381 | 3/1956 | United Kingdom . |
| 775323 | 5/1957 | United Kingdom . |
| 1188746 | 4/1970 | United Kingdom . |
| 1380013 | 1/1975 | United Kingdom . |
| 1489032 | 10/1977 | United Kingdom . |

Primary Examiner—Kenneth J. Dorner
Assistant Examiner—Brian K. Green
Attorney, Agent, or Firm—Ladas & Parry

[57] ABSTRACT

A dog clutch mechanism includes a case, first and second rotatable shafts rotatably disposed coaxially in the case, the second rotatable shaft having an annular groove defined in an outer periphery thereof, a dog piece fixedly mounted on the first rotatable shaft and having first dog teeth confronting an end of the second rotatable shaft, a hub axially slidably mounted on the second rotatable shaft and having second dog teeth meshingly engageable with the first dog teeth, the second dog teeth being movable out of meshing engagement with the first dog teeth under a thrust force in response to relative torque transmission between the first and second rotatable shafts. The hub has guide holes extending radially therethrough toward the second rotatable shaft and a plurality of balls are retained respectively in the guide holes are and engageable in the annular groove. A sleeve is axially slidably disposed on an outer periphery of the hub for engaging the balls and pressing the balls into at least the annular groove.

17 Claims, 9 Drawing Sheets

FIG. 3
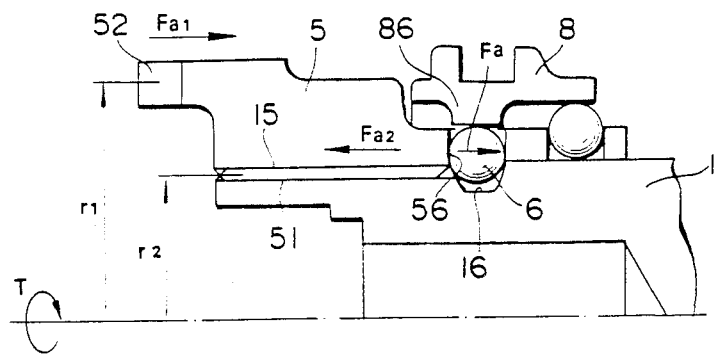
FIG. 4　　FIG. 5
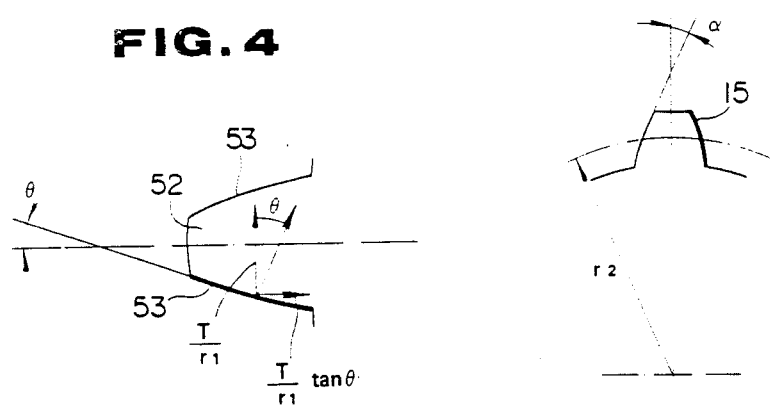
FIG. 6
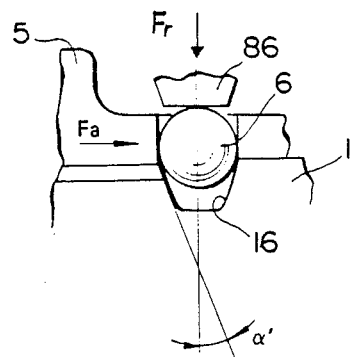

DOG CLUTCH MECHANISM

BACKGROUND OF THE INVENTION

1. Field of the Invention

The present invention relates to a dog clutch mechanism for selectively connecting and disconnecting input and output shafts which are coaxial with each other, and more particularly to a dog clutch mechanism for selectively connecting and disconnecting smoothly with a small force while drive power is being transmitted from the input shaft to the output shaft.

2. Description of the Prior Art

Various all-wheel-drive vehicles have been developed in recent years for higher stability and maneuverability during travel of the vehicles. One type of such all-wheel-drive vehicles is known as a part-time four-wheel-drive vehicle which can switch, as desired, between a two-wheel mode in which front or rear wheels serve as drive wheels under ordinary conditions, e.g., when running on the road, and a four-wheel mode in which drive torque is also transmitted to driven wheels under other conditions, e.g., when running off the road. All-wheel-drive vehicles of this type have a clutch on a rotatable drive shaft in order to selectively transmit drive torque from a power source via the rotatable drive shaft to the driven wheels.

Japanese Laid Open Patent Publication No. 58-56923, for example, discloses a part-time four-wheel-drive vehicle having a clutch mechanism comprising an electromagnetic clutch. Under normal running conditions, the vehicle operates as a front-wheel-drive vehicle in which only the front wheels are coupled to a drive shaft connected to a power source such as an engine. The drive shaft is connected as an input shaft to one end of the electromagnetic clutch. When the electromagnetic clutch is actuated as required, drive power can be transmitted from the drive shaft via the electromagnetic clutch to the rear wheels which are operatively coupled to the other end of the clutch, so that the vehicle can operate as a four-wheel-drive vehicle.

Japanese Laid-Open Utility Model Publication No. 55-1956 shows an all-wheel-drive vehicle equipped with a clutch mechanism comprising a dog clutch. The dog clutch is selectively engaged and disengaged to switch the vehicle between two-wheel-drive and four-wheel-drive modes.

The dog clutch disclosed in the latter publication differs from a friction clutch, such as the electromagnetic clutch disclosed in the former publication, in that since the dog clutch has meshing teeth for torque transmission, its structure is simple, no slippage whatsoever occurs, and reliable torque transmission is possible. The dog clutch however has problems in that it generates large shocks when it is engaged and disengaged, and requires a large operating force for disconnecting the shafts while torque is being transmitted between these shafts. Conventional dog clutches used to transmit and cut off drive power between coaxial input and output shafts have intermeshing dog teeth with their meshing surfaces lying parallel to the input and output shafts. Therefore, a very large operating force which is strong enough to overcome the meshing force of the dog teeth is necessary for disengaging the meshing dog teeth. At times, disengagement of the clutch may produce noise when dog teeth ride over confronting dog teeth, as well as produce a shock force.

SUMMARY OF THE INVENTION

In view of the foregoing problems of the conventional dog clutch device, it is an object of the present invention to provide a dog clutch mechanism for selectively connecting and disconnecting smoothly with a small force while drive power is being transmitted from an input shaft to an output shaft.

The dog clutch mechanism has an oil supply structure for forcibly supplying lubricating oil from an adjacent mechanism to sliding portions of the dog clutch mechanism, a torque limiting means in a dog clutch for preventing a torque in excess of a certain torque setting from being transmitted between the input and output shafts, and a detector means for detecting progressive disengagement of the dog clutch caused by the torque limiting means. When the progressive disengagement of the dog clutch is detected, the dog clutch can be disengaged smoothly with a small operating force, so that any noise and shock which are produced by the dog teeth as they strike against and ride on each other in a transition from engaging to disengaging conditions of the dog clutch can be reduced. The dog clutch mechanism itself and the adjacent mechanism can also be protected.

According to the present invention, there is provided a dog clutch mechanism which includes a case, first and second rotatable shafts rotatably disposed coaxially in the case, the second rotatable shaft having an annular groove defined in an outer periphery thereof, a dog piece fixedly mounted on the first rotatable shaft and having first dog teeth confronting an end of the second rotatable shaft, a hub axially slidably mounted on the second rotatable shaft and having second dog teeth meshingly engageable with the first dog teeth, the second dog teeth being movable out of meshing engagement with the first dog teeth under a thrust force in response to relative torque transmission between the first and second rotatable shafts, the hub having guide holes defined radially therethrough toward the second rotatable shaft, balls retained respectively in the guide holes and engageable in the annular groove, and an engaging means axially slidably disposed on an outer periphery of the hub for engaging the balls and pressing the balls into at least the annular groove.

The dog clutch mechanism also includes torque limiting means for progressively bringing the first and second dog teeth out of mesh with each other dependent on the thrust force thereby to prevent a torque in excess of a prescribed torque setting from being transmitted between the first and second rotatable shafts.

The first rotatable shaft has a transmission gear on an end thereof remote from the second rotatable shaft, the case having an auxiliary case storing lubricating oil therein and accommodating a differential having a drive gear partly immersed in the lubricating oil, the transmission and drive gears constituting a hypoid gear, and flow guide means disposed near the hypoid gear, the arrangement being such that in response to rotation of the drive gear, the lubricating oil is brought onto the flow guide means and directed by the flow guide means toward at least the first rotatable shaft.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is a fragmentary schematic diagram illustrating forces acting on dog teeth, a hub, balls, and a sleeve in analyzing an operating force on the dog clutch mechanism shown in FIG. 1;

FIG. 4 is a schematic view of a dog tooth shown in FIG. 3;

FIG. 5 is a schematic view of a spline shown in FIG. 3;

FIG. 6 is a fragmentary schematic view of a ball and surrounding parts shown in FIG. 3;

DETAILED DESCRIPTION OF THE PREFERRED EMBODIMENTS

Figure 1:
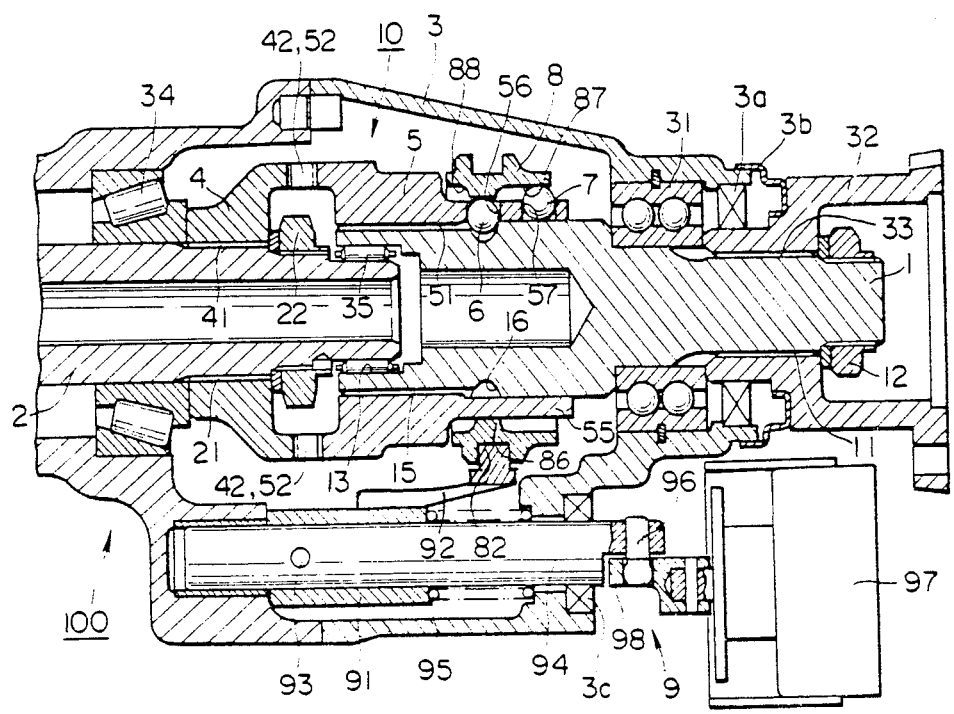
FIG. 1 is a longitudinal cross-sectional view of a dog clutch mechanism according to a first embodiment of the present invention.

A dog clutch mechanism, generally designated by the reference numeral 100, according to a first embodiment of the present invention will be described with reference to FIGS. 1 through 7.

Figure 7:
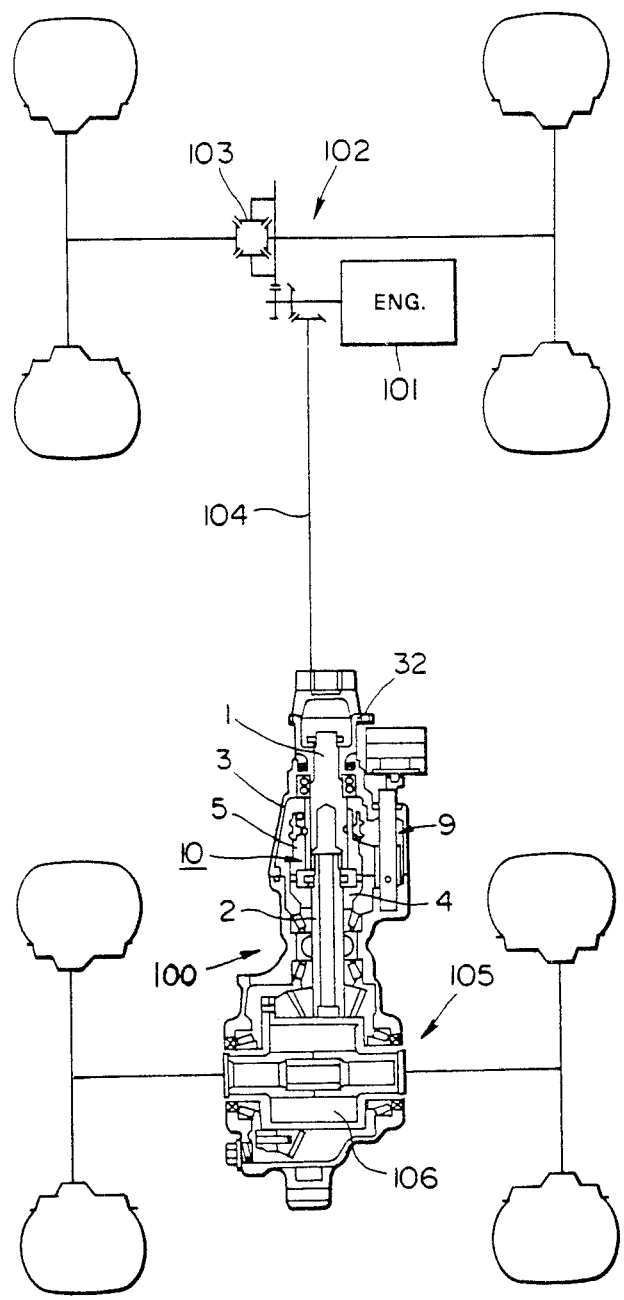
FIG. 7 is a schematic plan view of a four-wheel-drive vehicle incorporating the dog clutch mechanism illustrated in FIG. 1.

The dog clutch mechanism 100 shown in FIG. 1 is suitable for use in a four-wheel-drive vehicle illustrated in FIG. 7. In FIG. 7, drive output power produced by an engine 101 is transmitted to a differential 103 of a front wheel drive unit 102 and also to a differential 106 of a rear wheel drive unit 105 through a propeller shaft 104 extending longitudinally in the vehicle. The dog clutch mechanism 100 is disposed between the front and rear wheel drive units 102, 105, particularly between the propeller shaft 104 and the rear wheel drive unit 105, of the four-wheel-drive vehicle. The dog clutch mechanism 100 is selectively engaged and disengaged to switch the vehicle between a two-wheel-drive mode and a four-wheel-drive mode.

As shown in FIG. 1, the dog clutch mechanism 100 principally comprises an input shaft 1 coupled to the rear end of the propeller shaft 104, a output shaft 2 extending rearwardly from the rear end of the input shaft 1 in coaxial relation, a dog clutch 10 disposed between the input and output shafts 1, 2 for selectively transmitting and cutting off the transmission of drive power or torque from the input shaft 1 to the output shaft 2, and a dog clutch case 3 housing the dog clutch 10 and in which the input and output shafts 1, 2 are rotatably supported. More specifically, the input shaft 1 has a front portion rotatably supported in a front portion of the case 3 by a bearing 31, and a flange coupling 32 is fitted over the front portion of the input shaft 1 through splines 11, 33 and fixed in position by a nut 12. The output shaft 2 has a front portion rotatably supported in a rear portion of the case 3 by a bearing 34. The front portion of the output shaft 2 has a front end rotatably supported in a circular recess 13 defined in the rear end of the input shaft 1 by means of a bearing 35 for rotation with respect to the input shaft 1. The propeller shaft 104 (FIG. 7) extending from the engine 101 is coupled to the input shaft 1 by the flange coupling 32.

Figure 2:
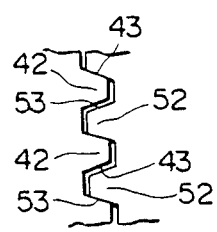
FIG. 2 is a fragmentary developed view showing the manner in which confronting dog teeth mesh with each other.

As illustrated in FIG. 1, the dog clutch 10 comprises a dog piece 4, a hub 5, a plurality of balls 6, and a sleeve 8. The dog piece 4 is fitted over the front portion of the output shaft 2 through splines 21, 41 in the clutch case 3 and fixed in position by a nut 22. The hub 5 is fitted over the rear portion of the input shaft 1 through splines 15, 51 in the clutch case 3, the hub 5 being axially slidable over, but rotatable with, the input shaft 1. The dog piece 4 and the hub 5 have a number of dog teeth 42, 52, respectively, projecting axially on respective confronting surfaces thereof and which can mesh with each other. The dog teeth 42, 52 are circumferentially spaced at equal intervals, and equal in number to each other. As shown in FIG. 2, the dog teeth 42, 52 of this embodiment have tapered meshing surfaces 43, 53, respectively, on both sides in the direction in which the dog piece 4 and the hub 5 are rotatable, the tapered meshing surfaces 43, 53 being inclined with respect to the axis of dog piece 4 and the hub 5. When relative torque is transmitted from the input shaft 1 to the output shaft 2 while the tapered surfaces 43, 53 are in mesh with each other, i.e., when rotative driver power is transmitted from the input shaft 1 or driver shaft to the output shaft 2 or driven shaft, thrust forces are produced between the tapered meshing surfaces 43, 53 and act on the dog piece 4 and the hub 5 in axially opposite directions. The thrust force applied to the hub 5 slidable on the input shaft 1 tends to move the hub 5 axially in the forward direction (to the right in FIG. 1).

The hub 5 has a smaller-diameter front portion 55 slidably disposed over an intermediate portion of the input shaft 1. The smaller-diameter portion 55 has three, for example, guide holes 56 defined in a rear region thereof in circumferentially equally spaced relation and extending radially toward the input shaft 1. The smaller-diameter portion 55 also has guide holes 57 defined in a front region thereof. The balls 6 are rotatably disposed in the guide holes 56, respectively. Other balls 7 are also rotatably disposed in the guide holes 57, respectively. The input shaft 1 has an annular groove 16 defined in an outer peripheral surface of the intermediate portion thereof adjacent to the front ends of the splines 15. The balls 6 are pushed partly into the annular groove 16 by an annular inner land 86 of the sleeve 8. The guide holes 56 may be tapered holes that are progressively smaller in diameter radially inwardly toward the input shaft 1.

The sleeve 8 in the form of a hollow cylinder is axially slidably disposed over the smaller-diameter portion 55 of the hub 5. The annular inner land 86 of the sleeve 8 is disposed on an intermediate inner peripheral surface thereof near the rear end thereof and projects radially inwardly to push the balls 6 accommodated in the guide holes 56 into the annular groove 16 of the input shaft 1, the annular inner land 86 being slidable on the outer peripheral surface of the smaller-diameter portion 55. The sleeve 8 has a front inner peripheral surface 87 serving as a guide surface for slidingly guiding the front balls 7 which are accommodated in the guide holes 57 and roll on the outer peripheral surface of the intermediate portion of the input shaft 1. The sleeve 8 also has a rear inner peripheral surface 88 serving as a guide surface for slidingly guiding the rear balls 6 when the sleeve 8 is moved forwardly (to the right in FIG. 1).

An actuator device 9 for actuating the dog clutch 10 is mounted on the clutch case 3. The actuator device 9 comprises a shift rod 94 axially slidably disposed in the clutch case 3 parallel to the coaxial input and output shafts 1, 2, a solenoid unit 97 having a movable member 98 pivotally coupled by a pin 96 to the front end of the shift rod 94 which projects out of the case 3, a shift fork 91 fitted over and coupled to the shift rod 94 by a spring pin 93, and a return spring 95 disposed around the shift rod 94 under compression between the shift fork 91 and a front wall of the clutch case 3 for normally urging the shift rod 94 axially rearwardly with respect to the case 3. The shift fork 91 has two fork arms 92 between which the sleeve 8 extends and which engage in an annular groove 82 defined in the outer peripheral surface of the sleeve 8. The return spring 95 normally biases the shift fork 91 or the shift rod 94 in the rearward direction (to the left in FIG. 1) to cause the fork arms 92 to displace the sleeve 8 axially rearwardly for producing engagement of the dog clutch 10, as described later on. The return spring 95 partly serves as a connector means in the dog clutch mechanism 100.

When the solenoid unit 97 is energized, the movable member 98 is moved under magnetic forces to displace the shift rod 94 coupled thereto by the pin 96 from the illustrated position (FIG. 1) axially in the forward direction by a certain distance against the bias of the return spring 95. The sleeve 8 is therefore moved axially in the forward direction from the illustrated position by the same distance by the fork arms 92. When the solenoid unit 97 is deenergized, the actuator device 9 and the sleeve 8 return to the illustrated position under the resiliency of the return spring 95.

Denoted in FIG. 1 at 3a, 3c are oil seals, and 3b a ring plate.

Operation of the dog clutch mechanism 100 will be described in detail below.

While drive power is being transmitted from the input shaft 1 to the output shaft 2 through the dog clutch 10 as it is engaged, the solenoid unit 97 is energized to move the movable member 98. The shift rod 94 and the shift fork 91 are moved axially in the forward direction against the bias of the return spring 95, and the sleeve 8 engaging the fork arms 92 slides forwardly over the smaller-diameter portion 55 of the hub 5. The axially forward movement of the sleeve 8 displaces the land 86 to release the rear balls 6 which have been pushed into the annular groove 16 by the land 86. At this time, the hub 5 fitted axially slidably over the rear end of the input shaft 1 through the splines 15, 51 is subjected to the thrust force produced by the intermeshing tapered surfaces 43, 53 of the dog teeth 42, 52 while the dog piece 4 and the hub 5 are being rotated, the thrust force tending to displace the hub 5 axially forwardly (to the right in FIG. 1). Therefore, the balls 6 which are released from the land 86 and placed in the respective rear guide holes 56 in the smaller-diameter portion 55 of the hub 5 that is subjected to the forward thrust force, are pressed by the rear inner peripheral surfaces of the guide holes 56, while at the same time the balls 6 are subjected to centrifugal forces. Therefore, the balls 6 are displaced radially outwardly out of the annular groove 16 toward the guide surface 88 of the sleeve 8. Simultaneously, the hub 5 is moved forwardly on the input shaft 1, and the balls 6, 7 in the respective guide holes 56, 57 while being guided by the guide surfaces 88, 87 roll on the input shaft 1 in the forward direction, until the dog teeth 42, 52 are brought out of meshing engagement with each other.

By de-energizing the solenoid unit 97, the actuator device 9 and the sleeve 8 return to the illustrated position under the bias of the return spring 95 to engage the dog clutch 10.

The dog clutch 10 in the illustrated embodiment can be disengaged to cut off torque transmission from the input shaft 1 to the output shaft 2 with the small operating force required to move the sleeve 8 only which controls movement of the balls 6, by utilizing the thrust forces produced by meshing engagement of the dog teeth 42, 52. Therefore, the sleeve 8 serves as an engaging means for selectively taking the balls 6 into and out of engagement in the annular groove 16.

In the case where the four-wheel-drive vehicle shown in FIG. 7 is combined with a four-wheel anti-lock brake system, torque transmission to the rear wheel drive unit 105 can be cut off with a small operating force in response to operation of the four-wheel anti-lock brake system. Consequently, the four-wheel anti-lock brake system can be operated to effectively brake the front and rear wheels. When the four-wheel-drive vehicle incorporates an ordinary brake system, the dog clutch mechanism 100 is effective in maintaining stability of the vehicle in its behavior.

The above embodiment may be modified by mounting the dog piece 4 on the input shaft 1 and mounting the hub 6 on the output shaft 2.

The fact that the dog clutch 10 can switch between the engaged and disengaged positions with a small operating force even while the torque is being transmitted from the input shaft 1 to the output shaft 2 will be theoretically analyzed by using equations.

In FIG. 3, $Fa_1$ represents a thrust force produced by meshing engagement of the dog teeth 42, 52, $Fa_2$ an axial frictional resistance generated by engagement of the splines 15, 51 of the input shaft 1 and the hub 5, $Fa$ a force with which the hub 5 pushes the balls 6, $T$ a transmitted torque, $r_1$ the radius of a circle along which the dog teeth 42, 52 rotate, and $r_2$ the radius of a circle along which the splines 15, 51 rotate.

As shown in FIG. 4, assuming that $\theta$ indicates the angle of the tapered meshing surfaces 43, 53 of the dog teeth 42, 52 and $\mu_1$ the coefficient of friction of the tapered tooth surfaces 43, 53, the thrust force $Fa_1$ is expressed as follows:

$$Fa_1 = \frac{T}{r_1} \tan\theta - \mu_1 \cdot \frac{T}{r_1}$$
$$= \frac{T}{r_1} (\tan\theta - \mu_1)$$

It is assumed in FIG. 5 that $\alpha$ represent the pressure angle of the splines 15, 51 and $\mu_2$ the coefficient of friction of the meshing surfaces of the splines 15, 51. The frictional resistance Fa₂ is given as follows:

$$Fa_2 = \frac{T}{r_2} \cdot \frac{\mu_2}{\cos\alpha}$$

From FIG. 3, it can been seen that $$Fa = Fa_1 - Fa_2 (> 0)$$
$$= \frac{T}{r_1}(\tan\theta - \mu_1) - \frac{T}{r_2} \cdot \frac{\mu_2}{\cos\alpha}$$

It is assumed in FIG. 6 that the angle of a slanted side surface of the groove 16 is indicated by α′, the force with which the balls 6 are pressed by the sleeve 8 is indicated by Fr, the coefficient of friction between the hub 5 and the balls 6 is indicated by μ₃, the coefficient of friction between the input shaft 1 and the balls 6 is indicated by μ₄, and the coefficient of friction between the balls 6 and the sleeve 8 is indicated by μ₅. The force Fr is expressed by:

$$Fr = Fa \cdot \tan\alpha' - \mu_3 \cdot Fa - \mu_4 \cdot Fa$$
$$= (\tan\alpha' - \mu_3 - \mu_4) \cdot Fa$$

Therefore, the force Fs which is required to operate the sleeve 8 is given by:

$$Fs = \mu_5 \cdot Fr$$
$$= \mu_5(\tan\alpha' - \mu_3 - \mu_4) \cdot Fa$$
$$= \mu_5(\tan\alpha' - \mu_3 - \mu_4) \cdot Fa \times$$
$$\left\{ \frac{T}{r_1}(\tan\theta - \mu_1) - \frac{T}{r_2} \cdot \frac{\mu_2}{\cos\alpha} \right\}$$

Therefore, it can be understood that the force Fs required to operate the sleeve 8 can be sufficiently reduced by selecting suitable values for α, α′, θ, r₁, and r₂.

The conventional dog clutches cannot be switched between the engaged and disengaged positions unless $$Fs > Fa$$

With the dog clutch of the present embodiment, since thrust force is produced by meshing engagement between the dog teeth 42, 52, the balls 6 can be displaced out of the annular groove 16 under the thrust force thus produced, simply by moving the sleeve 8, and the hub 5 can be displaced to bring the dog teeth 42, 52 out of meshing engagement with each other. Therefore, the input and output shafts can be connected and disconnected, while drive power is being transmitted by a small operating force which is only large enough to move the sleeve 8 that controls movement of the balls 6.

A dog clutch mechanism according to a second embodiment of the present invention will be described with reference to FIGS. 8 through 13. Those components of the second embodiment which are identical in structure and function to those of the first embodiment are designated by identical reference numerals.

Figure 8:
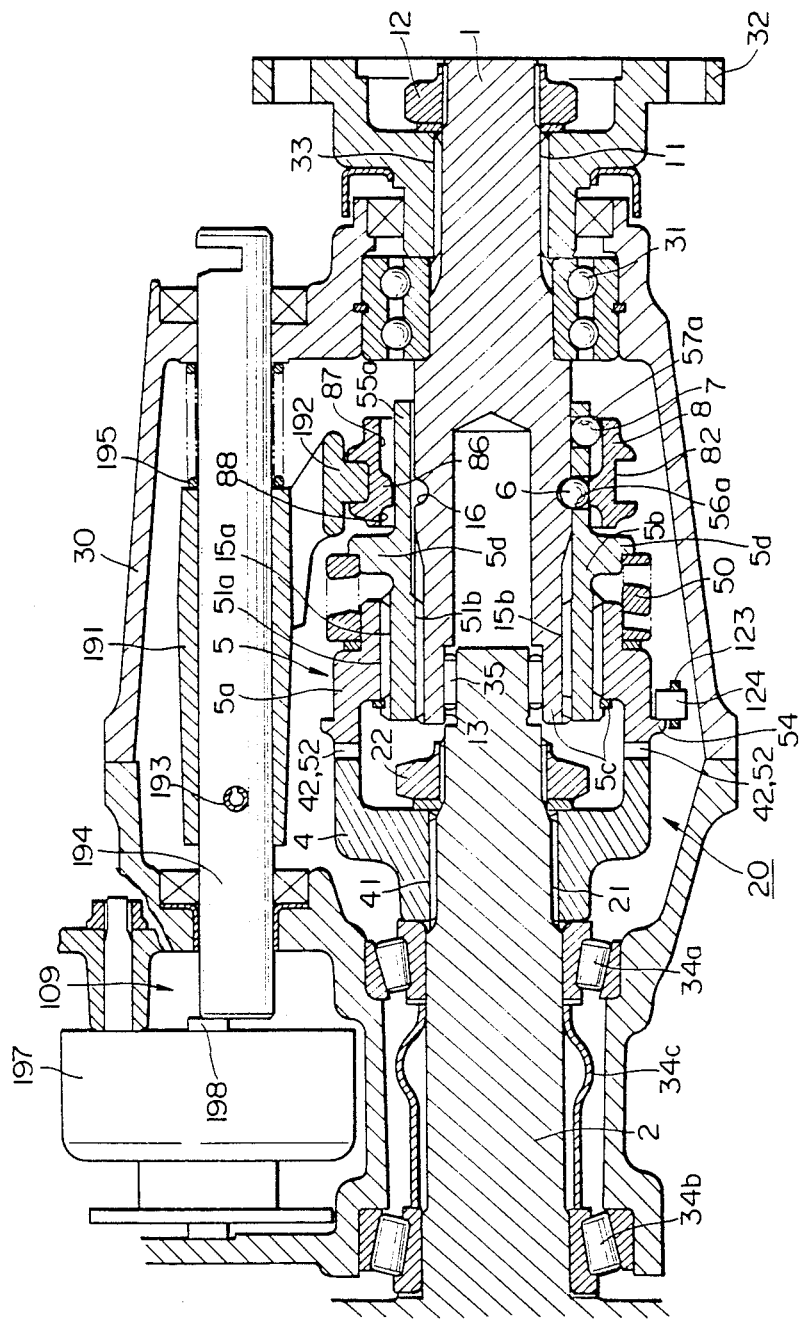
FIG. 8 is a longitudinal cross-sectional view of a dog clutch mechanism according to a second embodiment of the present invention.

FIG. 8 shows in cross section the dog clutch mechanism, denoted at 200, of the second embodiment. The dog clutch mechanism 200 is of basically the same construction as that of the dog clutch mechanism 100 of the first embodiment, and has coaxial input and output shafts 1, 2 rotatably supported in a clutch case 30. The output shaft 2 is positioned in a rear portion of the clutch case 30 by means of front and rear bearings 34a, 34b and a ring plate 34b extending therebetween. The front end of the output shaft 2 is rotatably fitted in a circular recess 13 defined in the rear end of the input shaft 1 for rotation with respect thereto.

A dog clutch 20 comprises a dog piece 4, a hub 5, a plurality of balls 6, and a sleeve 8. The hub 5 of the second embodiment comprises a first hub 5a and a second hub 5b. The second hub 5b is fitted over a rear portion of the input shaft 1 through splines 15b, 51b in the clutch case 30, the hub 5b being axially slidable over, but rotatable with, the input shaft 1. The first hub 5a is fitted over a rear portion of the second hub 5b through splines 15a, 51a for axial sliding movement over, but rotation with, the second hub 5b. The first hub 5a is prevented from being displaced rearwardly by a set ring 5c fitted over the rear end of the input shaft 1.

The dog piece 4 and the first hub 5a have a number of dog teeth 42, 52, respectively, projecting axially on respective confronting surfaces thereof and which can mesh with each other. The dog teeth 42, 52 are circumferentially spaced at equal intervals, and equal in number to each other. The dog teeth 42, 52 of the second embodiment have tapered meshing surfaces 43, 53, respectively, on both sides in the direction in which the dog piece 4 and the hub 5 are rotatable, the tapered meshing surfaces 43, 53 being inclined with respect to the axis of dog piece 4 and the hub 5, as shown in FIG. 2. When relative torque is transmitted from the input shaft 1 to the output shaft 2 while the tapered surfaces 43, 53 are in mesh with each other, thrust forces are produced between the tapered meshing surfaces 43, 53 and act on the dog piece 4 and the hub 5 in axially opposite directions. The thrust force applied to the hub 5 slidable on the input shaft 1, particularly the first hub 5a, tends to move the hub 5 axially in the forward direction (to the right in FIG. 8).

The second hub 5b has a smaller-diameter front portion 55a slidably disposed over an intermediate portion of the input shaft 1. The smaller-diameter portion 55a has three, for example, guide holes 56a defined in a rear region thereof in circumferentially equally spaced relation and extending radially toward the input shaft 1. The smaller-diameter portion 55a also has guide holes 57a defined in a front region thereof. The balls 6 are rotatably disposed in the guide holes 56a, respectively. Other balls 7 are also rotatably disposed in the guide holes 57a, respectively. The input shaft 1 has an annular groove 16a defined in an outer peripheral surface of the intermediate portion thereof adjacent to the front ends of the splines 15b. The balls 6 are pushed partly into the annular groove 16a by an annular inner land 86 of the sleeve 8. The guide holes 56a may be tapered holes that are progressively smaller in diameter radially inwardly toward the input shaft 1.

The sleeve 8 in the form of a hollow cylinder is axially slidably disposed over the smaller-diameter portion 55a of the second hub 5b. The annular inner land 86 of the sleeve 8 is disposed on an intermediate inner peripheral surface thereof near the rear end thereof and projects radially inwardly to push the balls 6 accommodated in the guide holes 56a into the annular groove 16a of the input shaft 1, the annular inner land 86 being slidable on the outer peripheral surface of the smaller-diameter portion 55a. The sleeve 8 has a front inner peripheral surface 87 serving as a guide surface for slidingly guiding the front balls 7 which are accommodated in the guide holes 57a and roll on the outer peripheral surface of the intermediate portion of the input shaft 1. The sleeve 8 also has a rear inner peripheral surface 88 serving as a guide surface for slidingly guiding the rear balls 6 when the sleeve 8 is moved forwardly (to the right in FIG. 8).

The second hub 5b further includes an annular projection 5d on an outer intermediate peripheral surface thereof. A set coil spring 50 is disposed under compression as a torque limiting means between the annular projection 5d and the first hub 5a. The set spring 50 normally urges the first hub 5a rearwardly (to the left in FIG. 8) in the direction to mesh with the dog piece 4, against the force tending to move the first hub 5a axially under the thrust forces produced by meshing engagement of the dog teeth 42, 52. The resilient urging force of the set spring 50 thus establishes an allowable torque setting that can be transmitted from the input shaft 1 to the output shaft 2. An actuator device 109 for actuating the dog clutch 20 is mounted on the clutch case 30, the actuator device 109 being similar to the actuator device 9 of the first embodiment.

The actuator device 109 comprises a shift rod 194 axially slidably disposed in the clutch case 30 parallel to the coaxial input and output shafts 1, 2, a shift fork 191 fitted over and coupled to the shift rod 194 by a spring pin 193 and having two fork arms 192 engaging in an annular groove 82 defined in the outer periphery of the sleeve 8, a return spring 195 disposed around the shift rod 194 under compression between the shift fork 191 and a front wall of the clutch case 30 for normally urging the dog clutch 20 to engage, and a solenoid unit 197 having a movable member 198 coupled to the rear end of the shift rod 194 which projects rearwardly from the case 30.

When the solenoid unit 197 is energized, the movable member 198 is moved under magnetic forces to displace the shift rod 194 from the illustrated position (FIG. 8) axially in the forward direction by a certain distance against the bias of the return spring 195. The sleeve 8 is therefore moved axially in the forward direction from the illustrated position by the same distance by the fork arms 192. When the solenoid unit 197 is de-energized, the actuator device 109 and the sleeve 8 return to the illustrated position under the resiliency of the return spring 195.

Operation of the dog clutch mechanism 200 of the second embodiment will be described in detail below.

While drive power is being transmitted from the input shaft 1 to the output shaft 2 through the dog clutch 20 as it is engaged, the solenoid unit 197 is energized to move the movable member 198. The shift rod 194 and the shift fork 191 are moved axially in the forward direction against the bias of the return spring 195, and the sleeve 8 engaging the fork arms 192 slide forwardly over the smaller-diameter portion 55a of the second hub 5b. The axially forward movement of the sleeve 8 displaces the land 86 to release the rear balls 6 which have been pushed into the annular groove 16a by the land 86. At this time, the first hub 5a fitted axially slidably over the second hub 5b through the splines 15a, 51a which is in turn fitted axially slidably over the rear end of the input shaft 1 through the splines 15b, 51b is subjected to the thrust force produced by the intermeshing tapered surfaces 43, 53 of the dog teeth 42, 52 while the dog piece 4 and the hub 5 are being rotated, the thrust force tending to displace the first hub 5a axially forwardly (to the right in FIG. 1). Therefore, the balls 6 which are released from the land 86 and placed in the respective rear guide holes 56a in the smaller-diameter portion 55a of the second hub 5b that is subjected to the forward thrust force through the set spring 50, are pressed by the rear inner peripheral surfaces of the guide holes 56a, while at the same time the balls 6 are subjected to centrifugal forces. Therefore, the balls 6 are displaced radially outwardly out of the annular groove 16 toward the guide surface 88 of the sleeve 8. Simultaneously, the second hub 5b starts moving forwardly on the input shaft 1 under the thrust force applied through the set spring 50, and the balls 6, 7 in the respective guide holes 56a, 57a while being guided by the guide surfaces 88, 87 roll on the input shaft 1 in the forward direction, until the dog teeth 42, 52 are brought out of meshing engagement with each other.

By de-energizing the solenoid unit 197, the actuator device 109 and the sleeve 8 return to the illustrated position under the bias of the return spring 195 to engage the dog clutch 20.

In the second embodiment, the dog clutch 20 can also be disengaged to cut off torque transmission from the input shaft 1 to the output shaft 2 with the small operating force required to move the sleeve 8 only which controls movement of the balls 6, by utilizing the thrust forces produced by meshing engagement of the dog teeth 42, 52.

According to the second embodiment, then the torque being transmitted is increased while the input and output shafts 1, 2 are being connected by the dog clutch 20, the thrust forces generated by meshing engagement between the dog teeth 42, 52 are also increased. At the time the force applied to the first hub 5a to move the latter forwardly exceeds the resilient force of the set spring 50, the set spring 50 is progressively compressed and the first hub 5a starts being disengaged from the dog piece 4. Thus, any excessive torque is prevented from being transmitted from the input shaft 1 to the output shaft 2.

Figure 11:
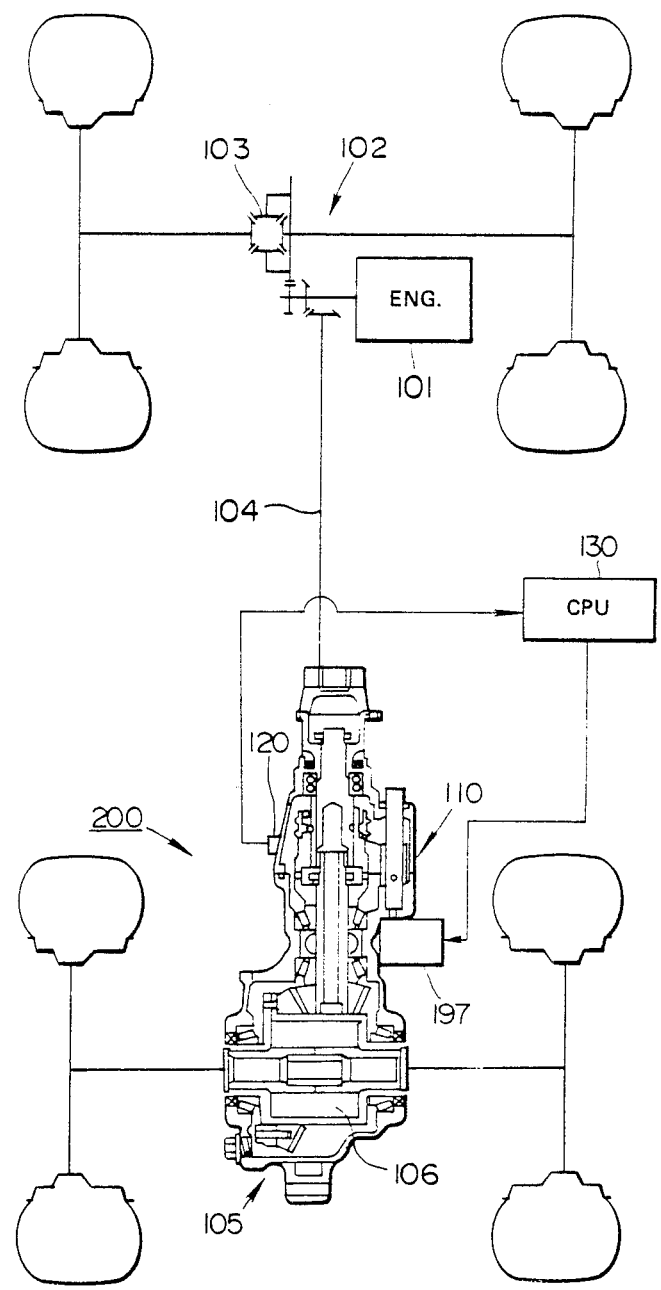
FIG. 11 is a schematic plan view of a four-wheel-drive vehicle incorporating the dog clutch mechanism illustrated in FIG. 8.

As shown in FIG. 11, the dog clutch mechanism 200 of the second embodiment is mounted on a propeller shaft 104 extending from a front wheel drive unit 102 coupled to an engine 101 to a rear wheel drive unit 105 in a four-wheel-drive vehicle. When the dog clutch 20 is engaged, the vehicle runs in a four-wheel-drive mode, and when the dog clutch 20 is disengaged, the vehicle runs in a two-wheel-drive mode. The rear wheel drive unit includes a rear differential comprising a viscous coupling 106. As is well known in the art, the viscous coupling 106 includes alternate plates fixed to an inner shaft and an outer case which is filled with a highly viscous fluid such as silicone oil. The viscous coupling 106 performs a differential function by shearing the silicone oil with the alternate plates, and also has an ability to limit the differential function.

Figure 12:
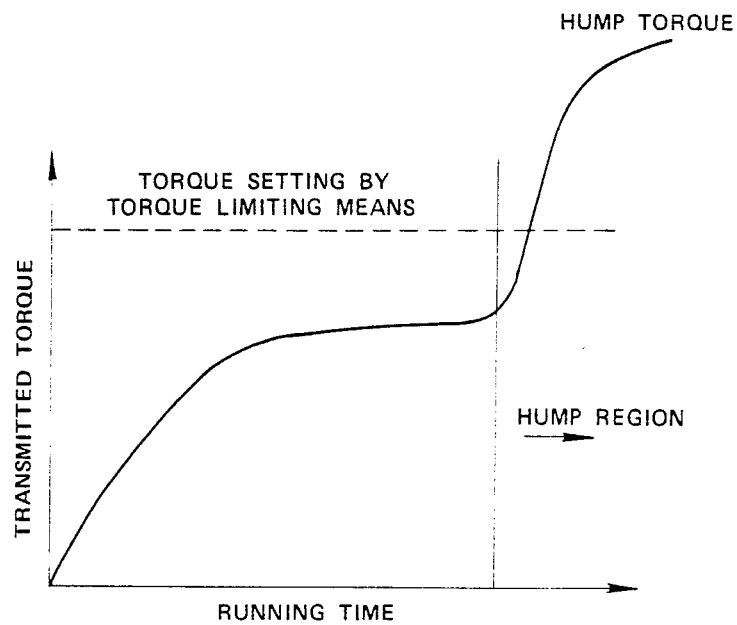
FIG. 12 is a graph showing a torque transmission curve of a viscous coupling.

The viscous coupling 106 used as the rear differential in the four-wheel-drive vehicle also serves as a central differential between the front and rear wheels. The relationship between running time and transmitted torque is shown in FIG. 12 when certain differential rotation is applied to the viscous coupling 106 at all times. As shown in FIG. 12, when the running time exceeds a certain value, the plates are brought into contact with each other due to an internal pressure buildup in the viscous coupling 106, causing an abrupt increase in the transmitted torque. This phenomenon is known as "hump".

In an actual process of designing the viscous coupling 106, the torque transmitted in a hump area is taken into consideration, and the mechanical strength of the splines of the plates in the viscous coupling 106 is analyzed to determine the number of plates to be employed. In the second embodiment, the torque setting determined by the resilient force of the set spring 50, or the torque limiting means, in the dog clutch 20 on the propeller shaft 104 for allowing torque transmission from the input shaft 1 to the output shaft 2, is selected to be smaller than the hump torque. In this manner, the hump of the viscous coupling 106 is prevented from occurring, and the number of plates employed is reduced, so that the the viscous coupling 106 is reduced in size and cost.

Figure 9:
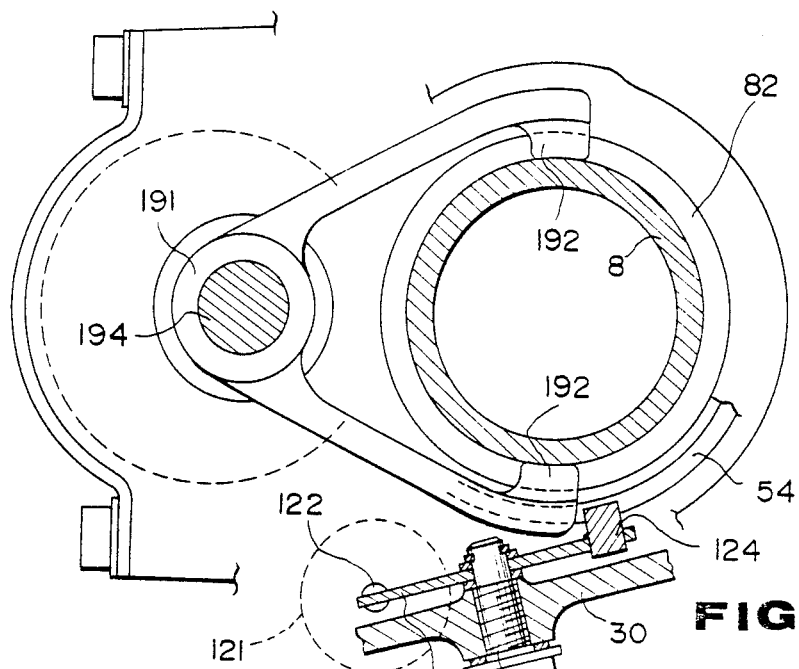
FIG. 9 is a transverse cross-sectional view of an actuator means and a detector means shown in FIG. 8.
Figure 10:
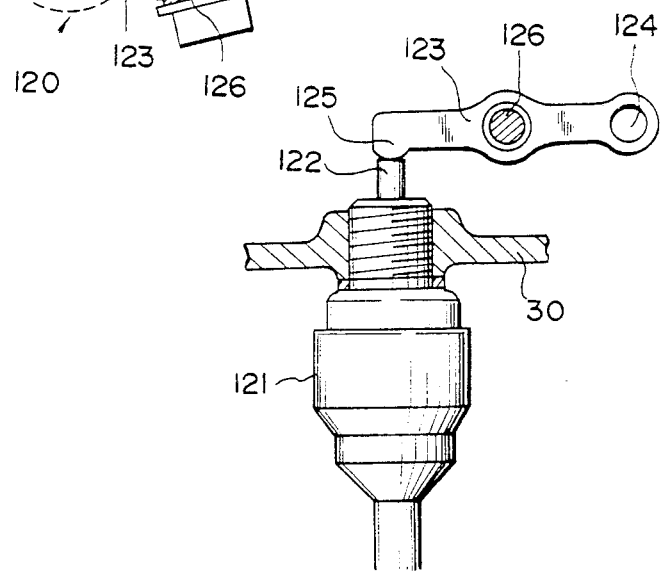
FIG. 10 is a view, partly in cross section, of a switch of the detector means of FIG. 9.

As shown in FIGS. 9 and 10, the dog clutch mechanism 200 of the second embodiment includes a detector means 120 disposed in the clutch case 30 for detecting a transition from the engaging condition of the dog clutch 20 to the disengaging condition thereof caused by the set spring 50, or for detecting progressive disengagement of the dog clutch 20. The detector means 120 comprises a stroke switch 121 and a lever 123. The stroke switch 121 is mounted on the clutch case 30 and can be turned on or off when a movable pin 122 of the stroke switch 121 is pushed in beyond a certain stroke by a presser 125 of the lever 123 which is disposed in the clutch case 30. The movable pin 122 projects from the stroke switch 121 into the clutch case 30. The lever 123 with the presser 125 on one end thereof contacting the movable 122 is centrally pivotally supported on a pivot shaft mounted on and projecting into the clutch case 30. The lever 123 has on its other end an engaging pin 124 held against a front surface of an annular ridge 54 on a rear outer peripheral surface of the first hub 5a as shown in FIG. 8. Therefore, a transition from the engaging condition of the dog clutch 20 to the disengaging condition thereof or vice versa can be detected by the detector means 120 in response to operation of the stroke switch 121 triggered by the lever 123 based on the position of the first hub 5a.

An output signal from the detector means 120 is applied to a computer 130 (FIG. 11) mounted as a control means on the vehicle. The computer 130 issues a control signal to the solenoid 197 or actuator of the actuator device 109. The computer 130 keeps the dog clutch 20 engaged under normal condition. In this embodiment, when an output signal from a braking detector means (not shown) for detecting a braking condition is ON, the computer 130 issues a control signal to disengage the dog clutch 20.

During a transition from the disengaging condition of the dog clutch 20 to an engaging condition thereof to be reached when the signal from the braking detector means is OFF, if the output signal from the detector means 120 still indicates the disengaging condition of the dog clutch 20 upon elapse of a prescribed period of time after a control signal is issued by the computer 130 to engage the dog clutch 20, then the computer 130 interrupts issuance of its control signal. If the output signal from the detector means 120 indicates a transition to a disengaging condition of the dog clutch 20 caused by the set spring 50 or progressive disengagement of the dog clutch 20 upon transmission of an excessive torque from the input shaft 1 to the output shaft 2, then the computer 130 issues a control signal to quickly disengage the dog clutch 20.

Figure 13:
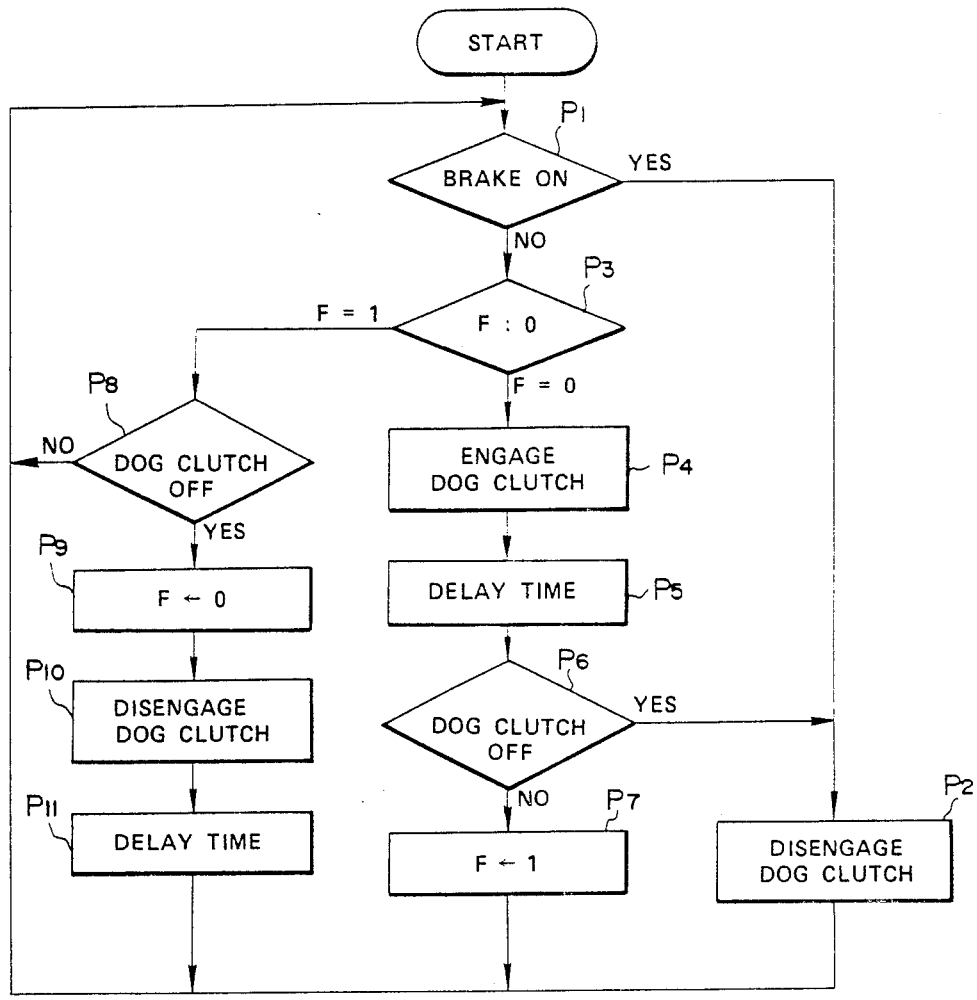
FIG. 13 is a flowchart of a control sequence for engaging and disengaging a dog clutch in the four-wheel-driven vehicle shown in FIG. 11.

A program or control sequence of the computer 130 will be described below with reference to FIG. 13.

A step $P_1$ first determines whether the braking signal from the braking detector means is ON or not. If ON, then a control signal is issued to disengage the dog clutch 20 in a step $P_2$. If OFF, then a step $P_3$ checks the value of a flag F which has been set to "0" in an initializing process. If the value of the flag F is "0", then a control signal is issued to engage the dog clutch 20 in a step $P_4$. If the value of the flag F is "1", then a step $P_8$ determines whether the signal from the detector means 120 indicating the condition of the dog clutch 20 is OFF (disengaged) or not.

If the flag F is "0", a control signal to connect the dog clutch 20 is issued in the step $P_4$, and after a prescribed period of time has elapsed in a step $P_5$, a step $P_6$ determines whether the signal from the detector means 120 indicating the condition of the dog clutch 20 is OFF (disengaged) or not. If the dog clutch is OFF (disengaged) in the step $P_6$, a control signal is issued in the step $P_2$ to disengage the dog clutch 20. If the dog clutch is ON (engaged) in the step $P_6$, then the flag F is set to "1", and thereafter the sequence from the step $P_1$ is executed again. If the flag F is "1" in the step $P_3$, then the step $P_8$ determines whether the signal from the detector means 120 indicating the condition of the dog clutch 20 is OFF (disengaged) or not, as described above. If the dog clutch 20 is OFF (disengaged), then the flag F is set to "0" in a step $P_9$, and a control signal to disengage the dog clutch 10 is issued in a step $P_{10}$, which is followed by a step $P_{11}$ in which a certain period of time is allowed to ellapse. Thereafter, the sequence from the step $P_1$ is executed again.

The control sequence from the step $P_1$ through the step $P_{11}$ is repeated.

If the signal from the detector means 120 indicating the condition of the dog clutch 20 is ON (engaged) in the steps $P_6$, $P_8$, then control returns to the step $P_1$ and goes through the step $P_3$ again to the step P. If the signal from the detector means 120 indicating the condition of the dog clutch 20 represents a transition to the OFF condition (disengaged) due to the torque limiting operation in the step $P_8$, then the step $P_{10}$ issues a control signal to disengage the dog clutch 20. Therefore, the dog clutch 20 is quickly disengaged.

In this manner, the dog clutch 20 is engaged only in a range in which the differential rotation between the input and output shafts 1, 2 is small and in which any noise shock produced by the dog teeth 42, 52 are not a problem in practice. In other range, the dog clutch 20 is disengaged and any engagement thereof is temporarily interrupted. In a transition to the disengaging condition caused by the torque limiting function of the dog clutch 20 upon transmission of an excessive torque from the input shaft 1 to the output shaft 2, or in progressive disengagement of the dog clutch 20, the dog clutch 20 is controlled so as to be quickly disengaged. With this control, the viscous coupling 106 used as the rear and central differential of the four-wheel-drive vehicle is prevented from suffering from hump, and the number of the plates in the viscous coupling 106 is reduced, with the result that the viscous coupling 106 can be reduced in size, weight, and cost.

The second embodiment of FIG. 8 may be modified by positioning the dog piece 4 on the input shaft 4 and positioning the hub 5 on the output shaft 2.

According to the second embodiment, as described above, when the output signal from the detector means indicates a transition caused by the torque limiting means from the engaging condition to the disengaging condition of the dog clutch, the control means applies a control signal to the actuator means to quickly disengage the dog clutch. Therefore, any noise and shock produced by the dog teeth upon a transition caused by the torque limiting function from the engaging condition to the disengaging condition of the dog clutch can be reduced. Accordingly, the dog clutch mechanism of the second embodiment is suitable for use in selectively transmitting drive power in a four-wheel-drive vehicle.

The dog clutch mechanisms of the first and second embodiments have many sliding portions which should preferably be lubricated with sufficient oil. As shown in FIGS. 7 and 11, since the dog clutch mechanism is disposed in front of the differential in the rear drive unit of the four-wheel-drive vehicle and coupled thereto through meshing gears, it is desirable that lubricating oil required by these meshing gears be also shared by the dog clutch.

Figure 15:
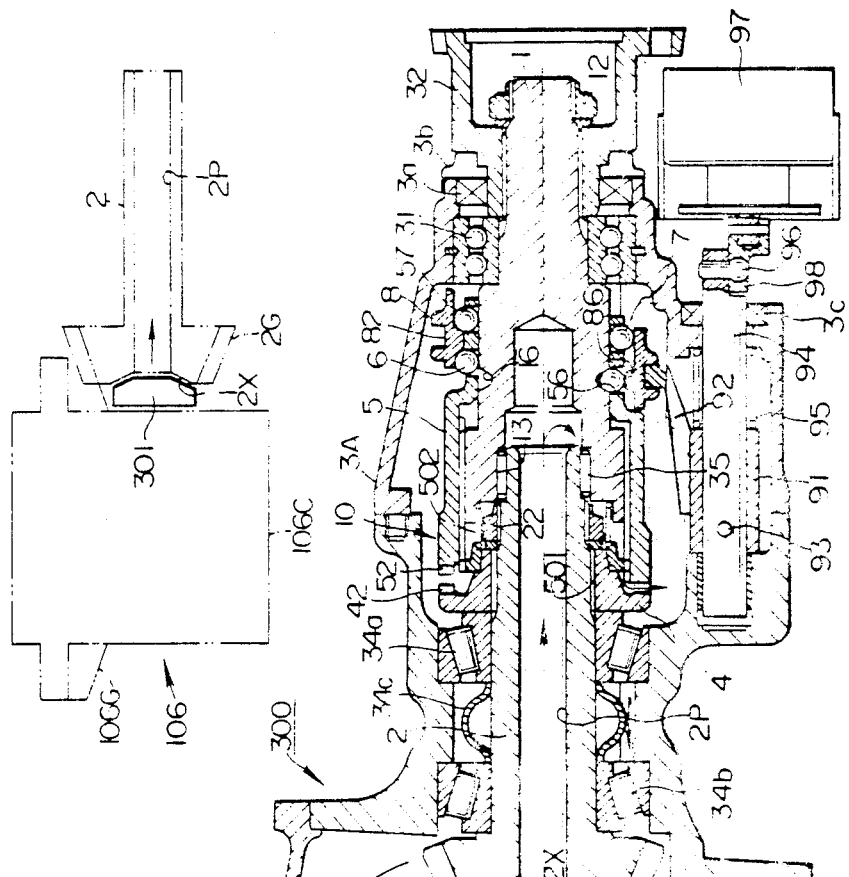
FIG. 15 is a plan view of a flow guide plate used with the dog clutch mechanism illustrated in FIG. 14.
Figure 14:
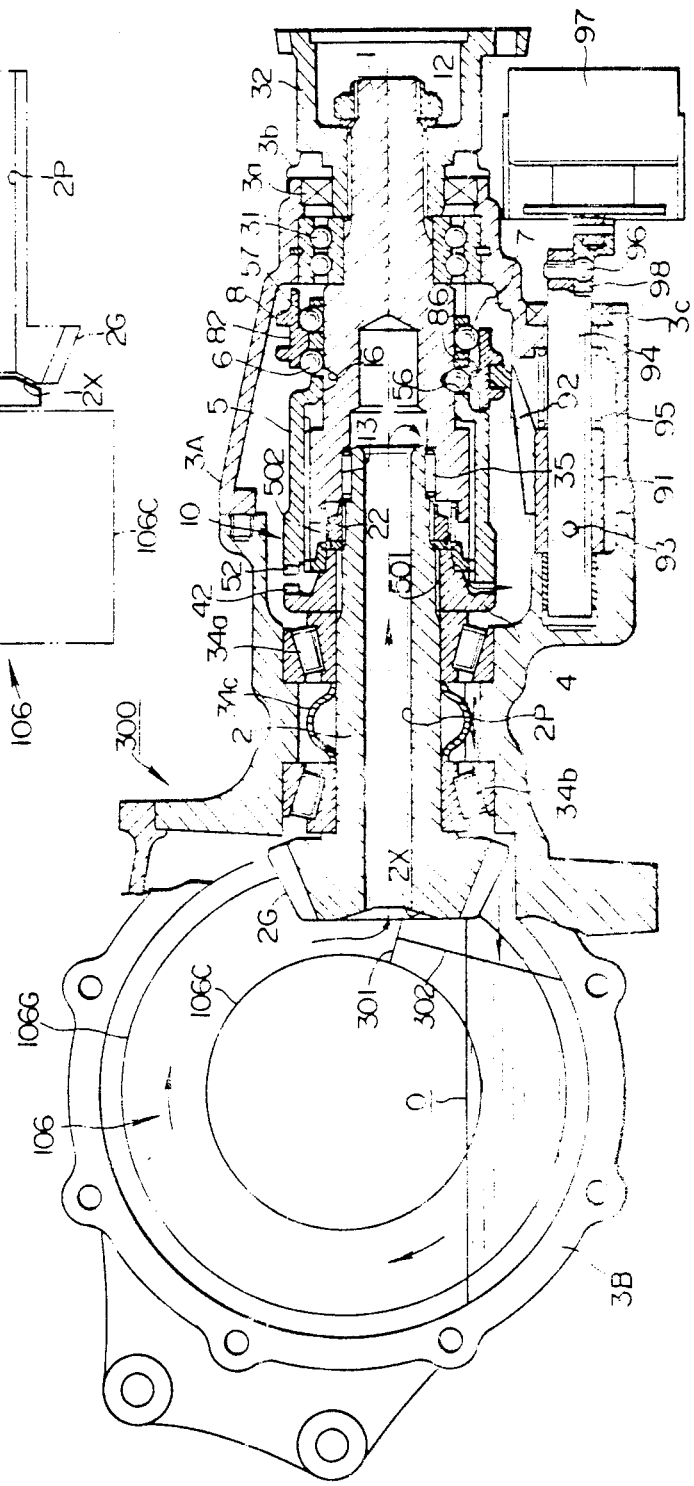
FIG. 14 is a longitudinal cross-sectional view of a dog clutch mechanism according to a third embodiment of the present invention.

According to a third embodiment shown in FIGS. 14 and 15, a dog clutch mechanism has an oil supply structure for supplying lubricating oil to sliding portions of a dog clutch from meshing gears between the dog clutch mechanism and a differential to which the dog clutch mechanism is coupled.

The dog clutch mechanism, generally designated at 300 in FIG. 14, is substantially identical in construction to the dog clutch mechanism of the first embodiment. Those parts of the dog clutch mechanism 300 which are identical to those of the first embodiment are denoted by identical reference numerals. The dog clutch mechanism 300 has a clutch case 3A including an auxiliary case 3B accommodating therein a differential 106 disposed behind the dog clutch mechanism 300. The dog clutch mechanism 300 has a dog clutch 10 including a spline member 501 mounted on the front end of a dog piece 4 and fitted in a hub 5 through splines. A spring 502 is disposed under compression between the spline member 510 and an input shaft 1. The spline member 501 and the spring 502 jointly constitute a synchronizing mechanism for synchronizing the dog piece 4 and the hub 5 when engaging the dog clutch 10. A gear 2G is disposed on the rear end of an output shaft 2 which projects into the auxiliary case 3B, the output shaft 2 being rotatably supported in the rear portion of the clutch case 3A by front and rear bearings 34a, 34b and a ring plate 34c disposed therebetween. As shown in FIG. 15, the gear 2G is held in mesh with a gear 106G on an outer periphery of a differential case 106C (described later) substantially at a right angle for transmitting drive power from the dog clutch mechanism 300 to the differential 106. The lower half of the dog clutch mechanism 10 in FIG. 14 is shown as de-energizing the solenoid unit 97 to cause the dog clutch 10 to be engaged under the bias of the return spring 95, whereas the upper half is shown as energizing the solenoid unit 97 to shift the shift fork arms 92 and the sleeve 8 axially forwardly to disengage the dog clutch 10.

The differential 106 serves as a viscous coupling rotatably housed in the auxiliary case 3B with its axis directed laterally of the vehicle. Drive power from the dog clutch mechanism 10 is applied to the viscous coupling through the gear 106G on the outer periphery of the differential case 106C. The gear 106G meshes with the gear 2G on the rear end of the output shaft 2 at a right angle, thus constituting a hypoid gear. The intermeshing gears 106G, 2G have lower portions immersed in lubricating oil O retained in the auxiliary case 3B and having an illustrated level.

An oil passage 2P is longitudinally defined axially centrally in the output shaft 2 for passage of the lubricating oil from the rear end to the front end of the oil passage 2P. The rear open end of the oil passage 2P opens into the auxiliary case 3B housing the differential 106, and the front open end of the oil passage 2P opens into a circular recess 13 defined in the rear end of the input shaft 1 housed in the clutch case 3A. A flow guide plate 301 shown in FIGS. 14 and 15 is disposed near the rear end of the oil passage 2P and between the rear end of the oil passage 2P and the outer periphery of the differential case 106C. The flow guide plate 301 faces a recess 2X defined in the rear end of the gear 2G of the output shaft 2 and is positioned beneath the rear open end of the oil passage 2P. The flow guide plate 301 is transversely wide and inclined downwardly forwardly with one side located adjacent to the gear 106G of the differential case 106C. The flow guide plate 301 is supported on an upstanding base plate 302 mounted on the bottom of the auxiliary case 3B as shown in FIG. 14.

When the gear 2G on the rear end of the output shaft 2 is rotated to rotate the differential case 106C and the gear 106G clockwise in the direction of the arrows in FIG. 14 while the four-wheel-drive vehicle is running forwardly with the dog clutch 10 engaged, lubricating oil O attached to the outer peripheral surface of the differential case 106C and the gear teeth of the gear 106G is brought up and then allowed to drop onto the upper surface of the flow guide plate 301. Since the flow guide plate 301 is inclined downwardly in the forward direction, the lubricating oil O falling on the upper surface thereof flows therealong into the rear open end of the oil passage 2P in the output shaft 2, and then passes through the oil passage 2P and then the front open end thereof into the circular recess 13 in the input shaft 1. Thereafter, the lubricating oil O flows from the circular recess 13 through a bearing 35 to the meshing dog teeth 42, 52 disposed below.

The lubricating oil O thus supplied from the auxiliary case 3B is stored on the bottom of the dog clutch case 3A, and then is also supplied to lubricate the splines of the hub 5 and the sliding portions of the balls 6, 7 and the sleeve 8, the sliding portion of the shift rod 94, and other sliding portions of the dog clutch mechanism 300. The lubricating oil O returns from the dog clutch mechanism 300 through the bearings 34a, 34b into the auxiliary case 3B. The above oil circulation is repeated to lubricate the dog clutch mechanism 300.

The differential 106 and the clutch are not limited to the illustrated structures, but may be of any desired structure.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is defined by the appended claims rather than by the foregoing description.

We claim:

1. A dog clutch mechanism comprising:
a case;

first and second rotatable shafts rotatably disposed coaxially in said case, said second rotatable shaft having an annular groove defined in an outer periphery thereof;
a dog piece fixedly mounted on said first rotatable shaft and having first dog teeth confronting an end of said second rotatable shaft;
a hub axially slidably mounted on said second rotatable shaft and having second dog teeth meshingly engageable with said first dog teeth, said second dog teeth being movable out of meshing engagement with said first dog teeth under a thrust force produced in response to relative torque transmission between said first and second rotatable shafts, said hub having first guide holes extending radially therethrough toward said second rotatable shaft;
a plurality of first balls retained respectively in said guide holes and engageable in said annular groove with said first and second dog teeth in meshing engagement; and
engaging means axially slidably disposed around an outer periphery of said hub and including a land for engaging said first balls and pressing the balls into said annular groove to maintain said first and second dog teeth in meshing engagement;
said hub having second guide holes spaced axially from said first guide holes, a plurality of second balls engaged in said second guide holes and held against said second shaft by said engaging means,
actuator means for sliding said engagement means on said first and second balls to release said land from said first balls and thereby enable said first balls to escape from said annular groove so that said hub can move relative to said second shaft and said second dog teeth on the hub can come out of meshing engagement with said first dog teeth,
said land being axially positioned between said first and second pluralities of balls when said first balls are out of said annular groove.

2. A dog clutch mechanism according to claim 1, wherein said first and second dog teeth have tapered intermeshing surfaces on both sides thereof in a direction in which the dog piece and the hub are rotatable, said tapered intermeshing surfaces being inclined with respect to axes of said dog piece and said hub for producing said thrust force in response to relative torque transmission between said first and second rotatable shafts.

3. A dog clutch mechanism according to claim 1, wherein said annular groove is defined in said second rotatable shaft at a position to cause said balls retained in said guide holes and engaging in said annular groove to keep said first and second dog teeth in mesh with each other.

4. A dog clutch mechanism according to claim 3, wherein said actuator means is operative also for shifting said engaging means in a direction opposite said thrust force to press said first balls into said annular groove and to slide said hub in opposition to said thrust force to bring said first and second dog teeth into mesh with each other.

5. A dog clutch mechanism according to claim 4, wherein said actuator means comprises a shift rod axially slidably supported in said case parallel to said first and second rotatable shafts, urging means for urging said shift rod axially, solenoid means for shifting said shift rod in the direction of said thrust force against the urging force of said urging means, and connecting means for connecting said shift rod and said engaging means to shift said engaging means with said shift rod.

6. A dog clutch mechanism according to claim 4, wherein said engaging means comprises a cylindrical sleeve slidably disposed on said hub with said land projecting radially inwardly for pressing said first balls into said annular groove and a guide surface disposed on one side of said land remote from said second balls, the arrangement being such that when said first balls are displaced out of said annular groove, the balls roll on said second rotatable shaft while being guided by said guide surface in response to sliding movement of said hub on said second rotatable shaft under said trust force.

7. A dog clutch mechanism according to claim 1, further comprising torque limiting means for progressively bringing said first and second dog teeth out of mesh with each other dependent on said thrust force thereby to prevent a torque in excess of a prescribed torque from being transmitted between said first and second rotatable shafts.

8. A dog clutch mechanism according to claim 7, further comprising:
detector means for detecting progressive disengagement of said first and second dog teeth caused by said torque limiting means; and
control means responsive to a signal from said detector means indicating the progressive disengagement of said first and second dog teeth for issuing a control signal to said actuator means to bring said first and second dog teeth out of mesh with each other.

9. A dog clutch mechanism according to claim 7, wherein said hub comprises a first hub portion having said second dog teeth and a second hub portion over which said first hub portion is axially slidably fitted and which is axially slidably disposed on said second rotatable shaft, said torque limiting means comprising a resilient member disposed under compression between said first and second hub portions for resiliently urging the first and second hub portions for relative displacement.

10. A dog clutch mechanism according to claim 9, wherein said resilient member comprises a spring having a spring constant corresponding to said prescribed torque.

11. A dog clutch mechanism according to claim 8, mounted for selectively transmitting drive power in a four-wheel-drive vehicle.

12. A dog clutch mechanism according to claim 11, wherein said actuator means includes connecting means for shifting said engaging means in a direction opposite said thrust force to press said balls into said annular groove and enable said balls to cause said hub to slide against said thrust force to bring said first and second dog teeth into mesh with each other, and said control means comprises means for issuing a control signal to said actuator means to bring said first and second dog teeth into mesh with each other if the vehicle is not braked and said detector means does not produce a signal indicating the progressive disengagement of said first and second dog teeth.

13. A dog clutch mechanism according to claim 1, wherein said first rotatable shaft has a transmission gear on an end thereof remote from said second rotatable shaft, said case having an auxiliary case storing lubricating oil therein and accommodating a differential having a drive gear partly immersed in the lubricating oil, said transmission and drive gears constituting a hypoid gear, and flow guide means disposed near said hypoid gear, the arrangement being such that in response to rotation of said drive gear, the lubricating oil is brought onto said flow guide means and directed by said flow guide means toward at least said first rotatable shaft.

14. A dog clutch mechanism according to claim 11, wherein said first rotatable shaft has an oil passage defined coaxially therein.

15. A dog clutch mechanism according to claim 6 wherein said sleeve includes a second guide surface which rides on said second balls when the sleeve is shifted by the shift rod.

16. A dog clutch mechanism according to claim 15 wherein said land is fitted between said first and second balls when said engaging means is axially shifted to allow said dog teeth to disengage.

17. A dog clutch mechanism according to claim 6 wherein said land bears against said second balls when said sleeve has been displaced and said first balls are out of said annular groove.

* * * * *